Oct. 5, 1948.    N. H. GOLDSWORTHY    2,450,655
METHOD OF SPOT WELDING METAL KEYS TO METAL CAN ENDS
Filed Nov. 16, 1944
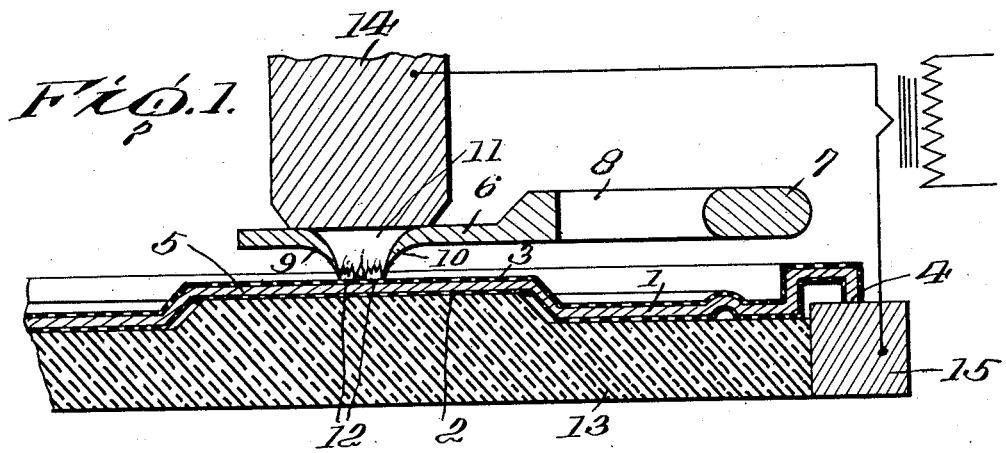
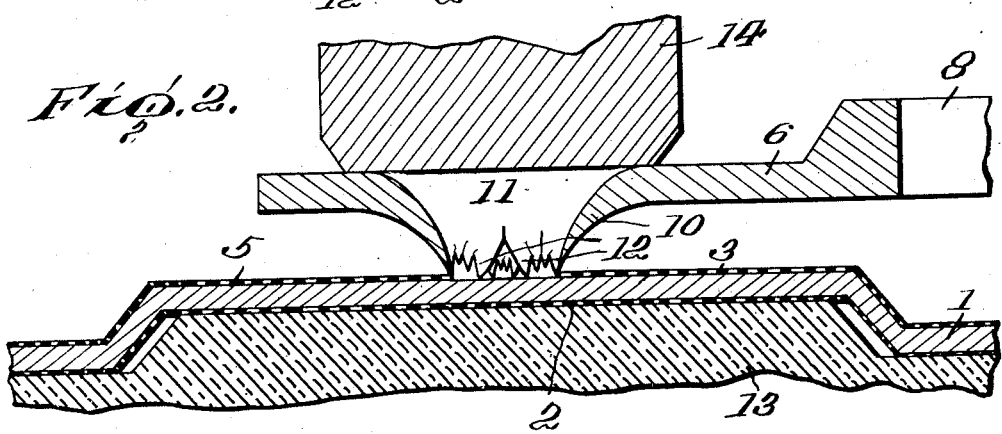
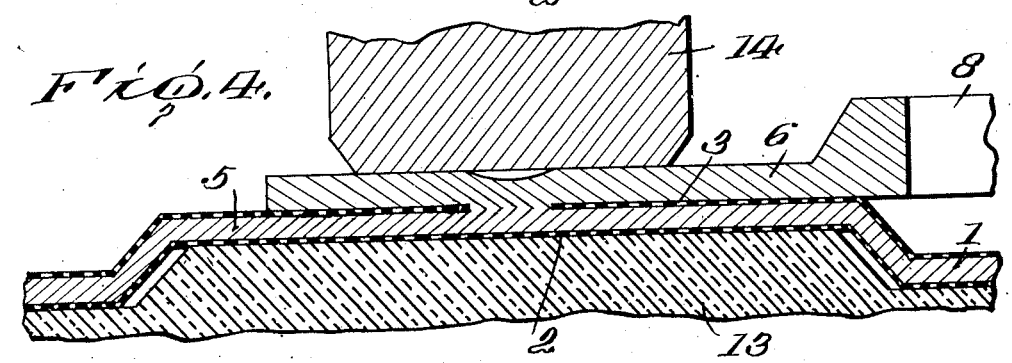
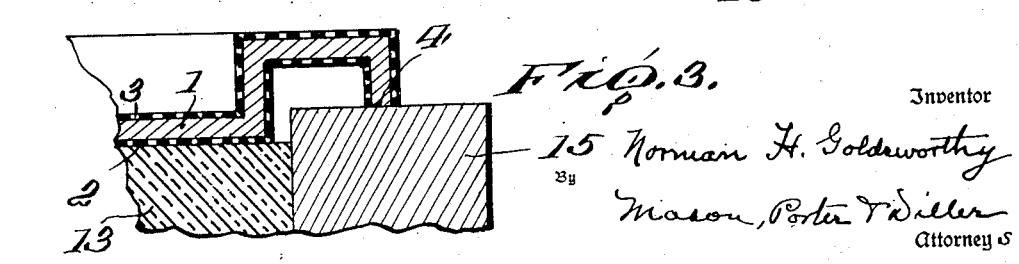
Inventor
Norman H. Goldsworthy
By Mason, Porter & Diller
Attorneys Patented Oct. 5, 1948

2,450,655

UNITED STATES PATENT OFFICE 2,450,655

METHOD OF SPOT WELDING METAL KEYS TO METAL CAN ENDS

Norman H. Goldsworthy, Chicago, Ill., assignor to Continental Can Company, Inc., New York, N. Y., a corporation of New York Application November 16, 1944, Serial No. 563,705

2 Claims. (Cl. 219—10)

The invention relates to new and useful improvements in the method of spot welding metal keys to sheet metal can ends.

It is often desirable to coat at least the interior surface of a sheet metal container with enamel, so that the product placed in the container does not directly contact with the metal from which the container is made. In such a container, it is desirable to coat the inner face of the can end with enamel.

It is also desirable in certain types of containers to secure a key used for opening the container to the can end by spot welding.

One of the methods practiced for spot welding a key to a can end includes the supporting of the end by an electrode, placing another electrode on the other side of the end above the supporting electrode and then passing the welding current between the electrodes. This results in the heating of the electrode supporting the end by the repeated welding cycles and, by its contact with and pressure against the end, the lacquered surface is disturbed and discolored. Furthermore, the electrode becomes coated with the coating material during the welding operations and provision must be made to clean the surface of the electrode.

In order to facilitate the welding, another practice is to temporarily displace the coating on the underside of the end by heating and softening a portion of it at the welding point to provide a path of travel for the welding current.

It has also been a common practice in the welding of keys to can ends coated with enamel on their inner faces to provide the key with sharp, rigid, teeth-like projections and to embed these projections into the metal of the can end to distort and emboss the underside of the end for the purpose of fracturing the lacquered coating, thereby providing a path for the welding current.

An object of the invention is to eliminate the necessity of an electrode beneath the spot to be welded and the necessity of distorting the container end surface, thereby eliminating the difficulties incident thereto.

A further object of the invention is to provide a method of spot welding keys to can ends wherein the heat incident to the welding operation is reduced to a minimum so as to avoid disturbing of the enameled coating on the inner face of the can end.

A still further object of the invention is to provide a method of spot welding a key to a container end wherein the follow-up pressure necessary to produce a welding bond between the key and the can end is reduced to a minimum, so as to avoid any distorting of the metal to which the key is attached or disturbance of the enameled coating on the inner face thereof.

These and other objects will in part be obvious and will in part be hereinafter more fully disclosed.

In the drawings,

Figure 1 is a sectional view showing the arrangement of the parts in the spot welding of a key to a container end.

Figure 2 is a very much enlarged sectional view through the key, the container end, and one of the electrodes in the region where the key is attached to the container end.

Figure 3 is an enlarged sectional view showing the electrode contacting with a bare metal edge of the container end.

Figure 4 is a view similar to Figure 2 but showing the completion of the welding operation.

The container end is illustrated at 1 in the drawing. This container end consists of a core of black iron or steel. Inasmuch as the iron oxidizes very easily when exposed to the air, it is coated with tin, enamel, or tin and enamel, or by other non-oxidizing coatings. These coatings are applied to the sheet in the flat, after which the blanks to form the can ends are cut from the sheet and then die-shaped to form the can end. It is sometimes desirable to provide a container with a non-metallic coating on its inner face, so that the product placed within the container does not contact with the metal from which the container is made. The can end, as illustrated in Figure 1, is provided with a suitable enamel coating 2 on its inner face. Whatever the coating may be, it is essential that it should cover the entire black plate and prevent the product within the container from contacting therewith.

As shown in Figure 1, the black iron core is also coated on the outer face as indicated at 3. This coating is likewise applied to the sheet in the flat. When the sheet is cut to provide the blank which is to be shaped into a can end, the metal core of the sheet will be exposed at the edge 4 of the can end. This cutting through of the sheet leaves the core metal at the edge bare.

This can end may be of any desired shape, but it is preferably provided with a raised portion 5 centrally thereof. The key to be attached to the can end is indicated at 6. The key has the usual handle portion 7 and is provided with a slot 8 adapted to be inserted onto the end of the tearing strip of the container, so that the turning of the key will rupture the metal along the edges of the tearing strip and thus open the container.

The key is extended beyond the slot and is thin in the section indicated at 9. This thin section 9 is preferably preformed before the key is attached to the can end by spot welding. The thin portion of the key is placed on a die and subjected to a piercing implement similar to a prick punch for the puncturing of the same. The opening on the die on which the sheet rests is considerably larger than the punch 2 and, therefore, the piercing of the metal will produce a cone-shaped portion projected from one side of the plane of the thinned portion of the key at the center of which cone-shaped portion the metal will be pierced. The piercing tool is relatively small and will produce an opening in the key by a tearing of the metal. This penetration of the metal also will draw the metal at the point of penetration and when the metal is ruptured, the opening will be surrounded by a relatively sharp, ragged, fragile projecting edge.

In Figure 2 of the drawings, this cone-shaped portion is indicated at 10, the opening at 11, and the sharp, torn, ragged, fragile edges at 12.

When the key is placed on a metallic coated container end, these sharp edges at the opening in the key will contact with the can end, making a metal-to-metal contact with the core 1 of the sheet metal forming the can end. If the end is enamel coated, these sharp edges in the key will cut therethrough, making a metal-to-metal contact with the core 1 of the sheet metal forming the can end.

In carrying out the welding method, the can end is placed on a supporting surface of insulating material indicated at 13 in the drawings. The electrode 14 of a welding unit is placed against the outer face of the thin portion of the key. This electrode is yieldingly pressed against the key and will force the cut edges through the enamel into firm contact with the core of the sheet metal forming the can end. The other electrode of the welding unit indicated at 15 is placed so as to contact with the bare edge 4 of the core of the sheet metal forming the can end. When a welding current is passed from one electrode to the other, it will pass through the key, the ragged edges surrounding the opening 11, and through the core of the sheet metal forming the can end and through the bare edge 4 of said core to the electrode 15. As the metal constituting these raw edges is fused, the electrode 14 presses the key against the can end with a follow-up pressure so that the key is brought closer and closer as the ragged edges are fused into the metal of the can end. As the ragged edges of the projections are very thin and fragile, and are softened to a fusing point quickly by the current, a very light follow-up pressure is used to bring the key and the can end into intimate contact, and no distortion of the can end is effected by this pressure. The method as broadly applied to the joining of metal parts by welding is shown and claimed in my co-pending application Serial No. 563,520, filed November 15, 1944.

The continued pressure of the electrode 14 causes the cone-shaped portion to be returned to the plane of the sheet from which it is formed and the pierced opening through the key will be closed up almost completely by the fused metal, as shown in Figure 4.

It will be noted that in applicant's method of spot welding the key to a can end the end rests on an insulated support which is of relatively large volume or area. This will quickly cool and dissipate any heat imparted to it by the welding operation. This, together with the fact that the welding current does not pass through the coating on the inner face of the can end, enables a firm welding bond to be established between the key and the end while the coating on the inner side of the end in the region where the weld takes place will be practically undisturbed.

From certain aspects of the invention, it will not be necessary to perform the key in the specific manner described above. It is, however, desirable to provide a projecting portion or portions on the contacting parts, so as to facilitate welding without the requirement of excessive heat or pressure during the welding operation. With the ragged edges about a punctured opening such as described above, a welding current of relatively low heat capacity may be used for fusing the key to the can end, and likewise only a relatively light follow-up pressure is necessary to bring about a joining of the parts by the spot welding.

As noted above, the method of spot welding may be applied to the joining of ears to a container body and for many other uses in connection with the spot welding of metal parts where it is desired to protect a coating applied to at least one face of one of the metal parts. It is essential, however, that where a metal part is coated, there shall be an exposed, bare edge of the base metal to which the coating is applied, so that the welding current may be passed into said base metal directly through direct contact with one of the electrodes of the welding unit.

It is obvious that minor changes may be made in the details of construction and the arrangement of parts without departing from the spirit of the invention as set forth in the appended claims.

What I claim is:

1. The method of spot welding a metal key to a sheet metal container end having a metal core and a protective coating of lacquer on its inner face, the core of metal of the container end being bare at the edge thereof, piercing the end of the key so as to provide an opening surrounded by a torn ragged edge projecting from the face of the key, assembling the parts to be joined so that the ragged edge contacts with the outer face of the can end inwardly from the edge thereof, contacting the key with one of the electrodes of a welding unit and contacting the bare edge of the metal core at a point distant from the key with the other electrode of the welding unit, passing a welding current from one electrode to the other through the key and metal core so as to avoid disturbance of the lacquer on the inner face of the container end and simultaneously applying a follow-up pressure to the electrode contacting with the key whereby the ragged projecting edge is progressively fused with the metal core of the container end.

2. The method of spot welding a metal key to a sheet metal container end having a metal core and a protective coating of lacquer on its inner and outer faces, the core of metal of the container end being bare at the edge thereof, piercing the end of the key so as to provide an opening surrounded by a torn ragged sharp edge projecting from the face of the key, assembling the parts to be joined so that the ragged sharp edge will cut through the lacquered outer face of the can end and contact with the metal core inwardly from the edge thereof, contacting the key with one of the electrodes of the welding unit and contacting the bare edge of the metal core at a point distant from the key with the other electrode of the welding unit, passing a welding current from one electrode to the other through the key and metal core so as to avoid disturbing the lacquer on the inner face of the container end and simultaneously applying a follow-up pressure to the electrode contacting with the key, whereby the ragged projecting edge is progressively fused with the metal core of the container.

NORMAN H. GOLDSWORTHY.

REFERENCES CITED

The following references are of record in the file of this patent:

UNITED STATES PATENTS

| Number | Name | Date |
| --- | --- | --- |
| 1,490,191 | Allcutt | Apr. 15, 1924 |
| 1,861,970 | Meadowcroft | June 7, 1932 |
| 2,087,530 | Potchen | July 20, 1937 |
| 2,096,495 | Hogg | Oct. 19, 1937 |
| 2,161,430 | Potchen | June 6, 1939 |
| 2,303,933 | Hale | Dec. 1, 1942 |
| 2,326,806 | Shmurak | Aug. 17, 1943 |
| 2,340,680 | Oswald et al. | Feb. 1, 1944 |